L. J. FREDERICKSON.
TIRE CORE.
APPLICATION FILED JAN. 30, 1915.

1,160,272.

Patented Nov. 16, 1915.

Inventor
L. J. Frederickson

Witnesses

UNITED STATES PATENT OFFICE.

LARS J. FREDERICKSON, OF KANSAS CITY, MISSOURI.

TIRE-CORE.

1,160,272.

Specification of Letters Patent.

Patented Nov. 16, 1915.

Application filed January 30, 1915. Serial No. 5,263.

*To all whom it may concern:*

Be it known that I, LARS J. FREDERICKSON, a citizen of the United States, residing at Kansas City, in the county of Jackson and State of Missouri, have invented certain new and useful Improvements in Tire-Cores; and I do hereby declare the following to be a full, clear, and exact description of the invention, such as will enable others skilled in the art to which it appertains to make and use the same.

This invention relates to vehicle tires and the primary object of the invention is the provision of a resilient core for insertion into the ordinary pneumatic shoe for replacing the ordinary type of inflatable tube now commonly used for cushioning the wheels of various vehicles.

Another object of this invention is to provide a tire core as specified which is constructed of resilient rubber and has a plurality of cups or recesses formed in the circumference thereof, and also a central opening extending about the entire circumference of the wheel tire for increasing the resilient proclivities of the core.

Another object of this invention is to provide a tire core which has formed in the lower end which is positioned in or adjacent to the portion of the tire shoe which is attached to the wheel rim, an annular groove bordered by a pair of outwardly extending points which are adapted for compression toward each other for causing the tire core to be seated firmly within the interior of the tire shoe for preventing slipping or creeping of the core within the shoe.

A still further object of this invention is to provide a tire core as specified which is provided with a plurality of circumferentially extending openings arranged within the core for decreasing the weight thereof and increasing the resiliency.

With the foregoing and other objects in view this invention consists in such novel features of construction, combination and arrangement of parts as will be hereinafter more fully described, and illustrated in the accompanying drawings.

In describing the invention in detail reference will be had to the accompanying drawings wherein like characters designate like or corresponding parts throughout the several views, and in which:—

Figures 1, 2:
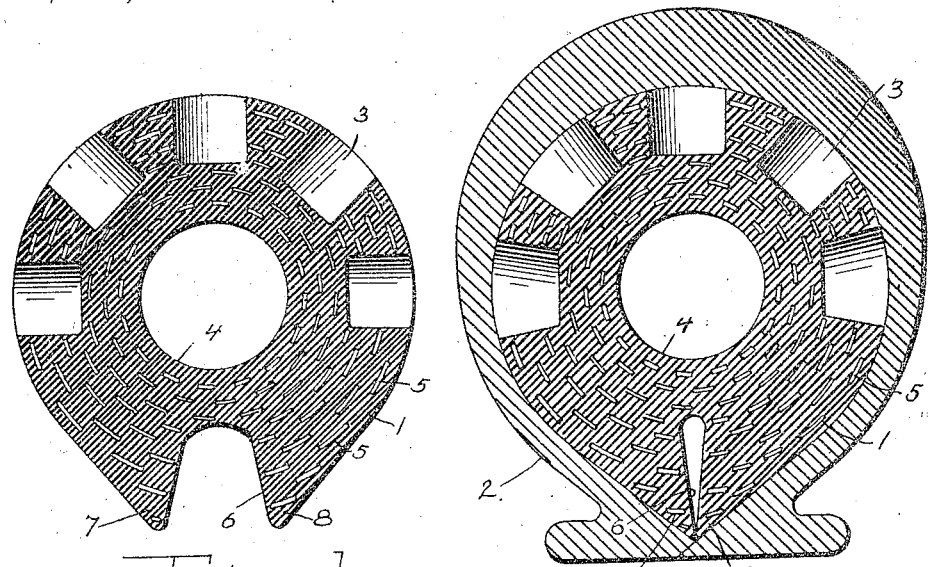
Figures 3, 4:
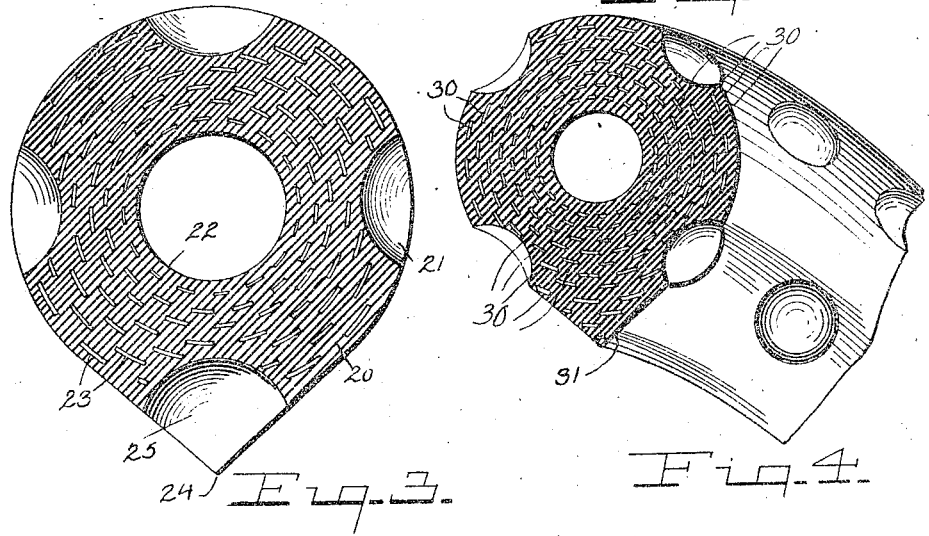

Figure 1 is a cross sectional view through the improved tire core. Fig. 2 is a cross sectional view through the tire core showing the same positioned within an ordinary tire shoe. Fig. 3 is a cross sectional view through a modified form of the invention, and Fig. 4 is a fragmentary perspective view of still another modified form of the tire core.

Referring more particularly to the drawings, 1 designates the core as an entirety, which is constructed of elastic or resilient rubber and shaped to conform to the configuration of the interior of an ordinary tire shoe indicated at 2 in Fig. 2 of the drawings.

The core 1 is provided with a plurality of recesses 3 formed in spaced rows about the lateral and longitudinal circumference of the core. The core 1 is further provided with a circular opening 4 formed centrally therein which extends entirely through the core and is provided for increasing the resilient proclivities of the core. The core 1 is further provided with a plurality of small openings 5 which are arranged in rows, and extend completely through the entire length of the core for decreasing the weight of the core as well as assisting the openings 3 and 4 in increasing the resiliency thereof. The openings 5 are spaced in rows radially of the center of the core and the openings in one circular row are arranged in staggered relation to the openings in the row next thereto so as to prevent weakening of the core.

The core 1 has a groove 6 formed in the inner portion or section of the tire or in other words formed in the section of the tire which is placed adjacent the wheel rim (not shown). The groove 6 has its sides extending radially from and converging toward the central axis of the core, and it is bordered upon each side by points 7 and 8 which are positioned for engagement with each other, constricting the groove 6 when the core is placed within the tire shoe as is clearly shown in Fig. 2 of the drawings. The constricting of the groove 6, and the forcing of the points 7 and 8 into engagement with each other, will place a strain upon this section of the core and cause the outer surfaces of the point to firmly engage the inner surface of the tire shoe. The outer surface of the points 7 and 8 extend tangentially from the circumference of the core 1.

In Fig. 3 of the drawings, a modified form of the tire core is illustrated, which embodies a core 20 having a plurality of substantially semi-circular shaped openings 21 formed in the circumference of the core and spaced in rows both transversely about the circumference and longitudinally along the entire circumference of the core. The core 20 is provided with a central circular opening 22 similar to the opening 4 and a plurality of small circumferentially extending openings 23 which are disposed staggeredly as are the openings 5 illustrated in the form shown in Figs. 1 and 2 of the drawings. The core 20 terminates in the pointed edge 24 which is provided for fitting in the tire shoe and this pointed edge of the core is also provided with a plurality of spaced cut out portions or recesses 25.

In Fig. 4 of the drawings a further modified form of the tire core is shown, wherein the core 30 is constructed practically identical with the core illustrated in Fig. 3, with the exception of the fact that the pointed inner edge 31 is free from recesses or cut out portions.

From the foregoing description taken in connection with the accompanying drawings it will be apparent to persons skilled in the art to which this invention appertains that a core for replacing the ordinary inflatable tubes on pneumatic tires has been provided, which core will eliminate many of the inconveniences contingent with the ordinary inflatable tube among which are the bursting of the inner tube, puncturing of the same or the flattening of the tire shoe when the inflatable tube becomes punctured. The core heretofore described will at all times hold the shoe in its proper position, and is replaceable from one shoe to the other, when the shoe wears to certain extent as to render it useless.

In reducing the invention to practice certain minor features of construction may necessitate alterations to which the patentee is entitled provided such alterations are comprehended within the scope of what is claimed.

What is claimed is:—

1. A core for insertion into an ordinary tire shoe constructed of resilient material and shaped to fit snugly within, a plurality of recesses formed therein, and a plurality of circumferentially extending openings arranged in radially disposed circles about the center of said core, the openings in each row being disposed staggeredly to the openings in the circular row next thereto.

2. A core for insertion into an ordinary tire shoe constructed of resilient material and having an annular groove cut in the inner face thereof, points formed upon said core and projecting tangentially from the circumference thereof, said points adapted for compression toward and into engagement with each other for constricting the sides of said groove when said core is placed within the tire shoe for holding the core within the shoe against creeping, said core being provided with a plurality of recesses formed in the outer circumference thereof, an opening formed centrally within said core and a plurality of small openings arranged in circular rows radially of the center of said core and extending entirely around the length of the core.

In testimony whereof I affix my signature in presence of two witnesses.

LARS J. FREDERICKSON.

Witnesses:
GEO. M. NOBLE, Jr.,
ROBT. J. CLARK.